United States Patent
Shen

(10) Patent No.: US 10,917,275 B2
(45) Date of Patent: Feb. 9, 2021

(54) INFORMATION TRANSMISSION METHOD FOR REDUCING PAPR, TRANSMITTING TERMINAL AND RECEIVING TERMINAL

(71) Applicant: VIVO MOBILE COMMUNICATION CO., LTD., Chang'an Dongguan (CN)

(72) Inventor: Xiaodong Shen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/474,669

(22) PCT Filed: Dec. 18, 2017

(86) PCT No.: PCT/CN2017/116806
§ 371 (c)(1),
(2) Date: Jun. 28, 2019

(87) PCT Pub. No.: WO2018/121317
PCT Pub. Date: Jul. 5, 2018

(65) Prior Publication Data
US 2020/0007372 A1    Jan. 2, 2020

(30) Foreign Application Priority Data

Dec. 30, 2016  (CN) .......................... 2016 1 1260120

(51) Int. Cl.
*H04L 5/12*         (2006.01)
*H04L 27/26*        (2006.01)
(Continued)

(52) U.S. Cl.
CPC ........ *H04L 27/2615* (2013.01); *H04L 5/0005* (2013.01); *H04L 25/03866* (2013.01); *H04L 27/2602* (2013.01)

(58) Field of Classification Search
CPC ............. H04L 27/2615; H04L 27/2602; H04L 25/03866; H04L 5/0005; H04L 27/26
See application file for complete search history.

(56) References Cited

U.S. PATENT DOCUMENTS 7,672,392 B2    3/2010  Johansson
2004/0093545 A1* 5/2004  Khandani ........... H04L 27/2614
                                                  714/746
(Continued)

FOREIGN PATENT DOCUMENTS

CN    101958873 A    1/2011
CN    102238126 A    11/2011
(Continued)

OTHER PUBLICATIONS

1st Chinese Office Action for Chinese Application No. 201611260120.0, dated May 22, 2019 (May 22, 2019)—12 pages (English translation—11 pages).

(Continued)

*Primary Examiner* — Dhaval V Patel
(74) *Attorney, Agent, or Firm* — Culhane Meadows PLLC; Stephen J. Weed

(57) ABSTRACT

An information transmission method for reducing Peak to Average Power Ratio (PAPR), a transmitting terminal and a receiving terminal are provided, to solve the technical problem that it is difficult for a transmitting terminal to reliably transmit side information to a receiving terminal by using conventional methods for reducing PAPR. The method includes: scrambling an initial data block according to a predetermined scrambling mode to obtain a scrambled target data block; determining a scrambling mode index corresponding to the predetermined scrambling mode according to a predetermined relation between scrambling mode indexes and scrambling modes; generating side information carrying the determined scrambling mode index based on (Continued)

the scrambling mode index; and transmitting the side information and the target data block to a receiving terminal.

18 Claims, 9 Drawing Sheets

(51) Int. Cl.
*H04L 5/00* (2006.01)
*H04L 25/03* (2006.01)

(56) References Cited

U.S. PATENT DOCUMENTS

| | | | |
|---|---|---|---|
| 2004/0146115 A1* | 7/2004 | Feng | H04L 1/0041 375/260 |
| 2006/0120268 A1* | 6/2006 | Bar-Ness | H04L 27/2614 370/208 |
| 2014/0362934 A1* | 12/2014 | Kumar | H04L 27/2618 375/260 |
| 2016/0143011 A1 | 5/2016 | Xia et al. | |
| 2016/0198446 A1 | 7/2016 | Wild et al. | |

FOREIGN PATENT DOCUMENTS

| | | |
|---|---|---|
| CN | 103391268 A | 11/2013 |
| CN | 104144030 A | 11/2014 |
| CN | 105356918 A | 2/2016 |
| CN | 105409155 A | 3/2016 |
| CN | 103391171 B | 6/2016 |
| CN | 106872968 A | 6/2017 |
| WO | 2006060651 A2 | 6/2006 |

OTHER PUBLICATIONS

Chang, Ming et al.: An Improved PTS Method with Low Computational Complexity Based on Gray Code, Computer & Digital Engineering, vol. 41, No. 3, Mar. 2013, 3 pages.
Deng, Xianfeng: Research on Peak-to-Average Power Ration Reduction in DFBC MIMO-OFDM Systems without Side Information, Master Thesis, Jan. 21, 2014, Huazhong Univ of Science & Technology, Wuhan, China, 66 pages.
FPGA OFDM—Master Dissertation (with English Abstract)—Univ of Electronic Science & Technology of China, Apr. 2011 (84 pages).
International Search Report and Written Opinion for International Application No. PCT/CN2017/116806, dated Jul. 11, 2019 (Jul. 11, 2019)—9 pages (English translation—6 pages).
Chinese Search Report for Chinese Application No. 201611260120.0 dated Dec. 30, 2019 (Dec. 30, 2019)—15 pages.
Extended European Search Report for European Application No. 17889335.0, dated Dec. 16, 2019 (Dec. 16, 2019)—7 pages.
Jayalath A D S et al: "Peak-to-average power ratio reduction of an OFDM signal using data permutation with embedded side information", 2001 IEEE International Symposium on Circuits and Systems : May 6-9, 2001, Sydney, Australia, vol. 4, May 6, 2001 (May 6, 2001), pp. 562-565.

\* cited by examiner

INFORMATION TRANSMISSION METHOD FOR REDUCING PAPR, TRANSMITTING TERMINAL AND RECEIVING TERMINAL

CROSS-REFERENCE TO RELATED APPLICATION

This application is the U.S. national phase of PCT Application No. PCT/CN2017/116806 filed on Dec. 18, 2017, which claims a priority to Chinese Patent Application No. 201611260120.0 filed on Dec. 30, 2016, the disclosure of which is incorporated in its entirety by reference herein.

TECHNICAL FIELD

The present disclosure relates to the field of communication technology, and in particular to an information transmission method for reducing PAPR, a transmitting terminal and a receiving terminal.

BACKGROUND

Orthogonal frequency division multiplexing (Orthogonal Frequency Division Multiplexing, OFDM) is a multi-carrier modulation (Multi-Carrier Modulation, MCM) technology, and a core idea thereof is dividing a channel into multiple orthogonal subchannels and performing narrowband modulation and transmission in individual subchannels, which reduces interference between or among the subchannels. A signal bandwidth of each subchannel is narrower than a coherence bandwidth of the channel, and therefore, frequency selective fading of each subchannel is flat, significantly eliminating inter-symbol interference. In addition, as carriers of the subchannels in an OFDM system are orthogonal with each other, frequency spectrums thereof are overlapped with each other, which not only reduces interferences between or among subcarriers but also improves utilization ratios of the frequency spectrums. The orthogonal modulation and demodulation in the subchannels can be performed through inverse fast Fourier transform (Inverse Fast Fourier Transform, IFFT) and fast Fourier transform (Fast Fourier Transform, FFT).

The OFDM system can provide wider coverage, better transmission quality, and higher data rate and spectral efficiency. Notwithstanding, as an OFDM symbol is formed by superimposing multiple independently-modulated subcarrier signals, the superimposed signal is subjected to modulation of a same initial phase signal in a case that phases of the subcarriers are identical or close to each other, which results in a large instantaneous peak power and thereby a large peak to average power ratio (Peak to Average Power Ratio, PAPR). As a dynamic range of an ordinary power amplifier is limited, a multi-input and multi-output orthogonal frequency division multiplexing (MIMO-OFDM) signal with a large PAPR is easily subjected to a nonlinear region of the power amplifier, causing nonlinear distortion to the signal, resulting in noticeable spectral spread interference and intraband signal distortion and degrading performance of the whole system. High PAPR has become a main technical obstacle against OFDM.

The method for reducing PAPR in related art mainly includes selective mapping (selective mapping, SLM) and partial transmit sequence (Partial Transmit Sequence, PTS), but in the two methods above, it is difficult for a transmitting terminal to transmit side information carrying scrambled information to a receiving terminal reliably.

SUMMARY

An information transmission method for reducing PAPR, a transmitting terminal and a receiving terminal are provided according to embodiments of the present disclosure, to solve a problem in a method for reducing PAPR in related art that it is difficult for a transmitting terminal to transmit side information carrying scrambled information to a receiving terminal reliably.

In a first aspect, an information transmission method for reducing PAPR is provided according to an embodiment of the present disclosure, which is applied to a transmitting terminal. The method includes:

scrambling an initial data block according to a predetermined scrambling mode to obtain a scrambled target data block;

determining a scrambling mode index corresponding to the predetermined scrambling mode according to a predetermined relation between scrambling mode indexes and scrambling modes;

generating side information carrying the determined scrambling mode index based on the scrambling mode index; and transmitting the side information and the target data block to a receiving terminal.

In a second aspect, an information transmission method for reducing PAPR is further provided according to an embodiment of the present disclosure, which is applied to a receiving terminal. The method includes:

obtaining side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode;

determining a scrambling mode corresponding to the scrambling mode index carried in the side information according to a predetermined relation between scrambling mode indexes and scrambling modes; and descrambling the target data block according to the determined scrambling mode to obtain the initial data block.

In a third aspect, a transmitting terminal is further provided according to an embodiment of the present disclosure, which includes:

a scrambling module, configured to scramble an initial data block according to a predetermined scrambling mode to obtain a scrambled target data block;

a first determination module, configured to determine a scrambling mode index corresponding to the predetermined scrambling mode according to a predetermined relation between scrambling mode indexes and scrambling modes;

a generation module, configured to generate side information carrying the determined scrambling mode index based on the scrambling mode index; and a transmitting module, configured to transmit the side information and the target data block to a receiving terminal.

In a fourth aspect, a receiving terminal is further provided according to an embodiment of the present disclosure, which includes:

an obtaining module, configured to obtain side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode;

a second determination module, configured to determine a scrambling mode corresponding to the scrambling mode index carried in the side information according to a predetermined relation between scrambling mode indexes and scrambling modes; and a processing module, configured to descramble the target data block according to the determined scrambling mode to obtain the initial data block.

In a fifth aspect, a transmitting terminal is further provided according to an embodiment of the present disclosure, which includes: at least one processor, a memory, at least one network interface and a user interface; and a bus system. The at least one processor, the memory, the at least one network interface and the user interface are coupled by the bus system above, and the at least one processor is configured to perform the method in the first aspect by invoking a program or instructions stored in the memory.

In a sixth aspect, a receiving terminal is further provided according to an embodiment of the present disclosure, which includes: at least one processor, a memory, at least one network interface and a user interface; and a bus system. The at least one processor, the memory, the at least one network interface and the user interface are coupled by the bus system above, and the at least one processor is configured to perform the method in the second aspect by invoking a program or instructions stored in the memory.

In this way, in the technical solutions according to the embodiments of the present disclosure, a target data block is obtained by scrambling an initial data block according to a predetermined scrambling mode; a scrambling mode index corresponding to the predetermined scrambling mode is determined according to a predetermined relation between scrambling mode indexes and scrambling modes; side information carrying the determined scrambling mode index is generated based on the scrambling mode index; and the side information and the target data block are transmitted to a receiving terminal, thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

BRIEF DESCRIPTION OF THE DRAWINGS

In order to better clarify the technical solutions according to embodiments of the present disclosure, the appended drawings involved in the description of the following embodiments are briefly introduced hereinafter. Apparently, the drawings only illustrate some embodiments of the present disclosure, and other drawings may be obtained based on these drawings by those skilled in the art without inventive efforts.

DETAILED DESCRIPTION

The technical solutions according to embodiments of the present disclosure are clearly and completely described in conjunction with the drawings of the embodiments of the present disclosure. Apparently, the described embodiments are only some rather than all embodiments of the present disclosure. Other embodiments obtained by those skilled in the art based on the embodiments of the present disclosure without inventive efforts shall fall within the scope of the present disclosure.

Figure 1:
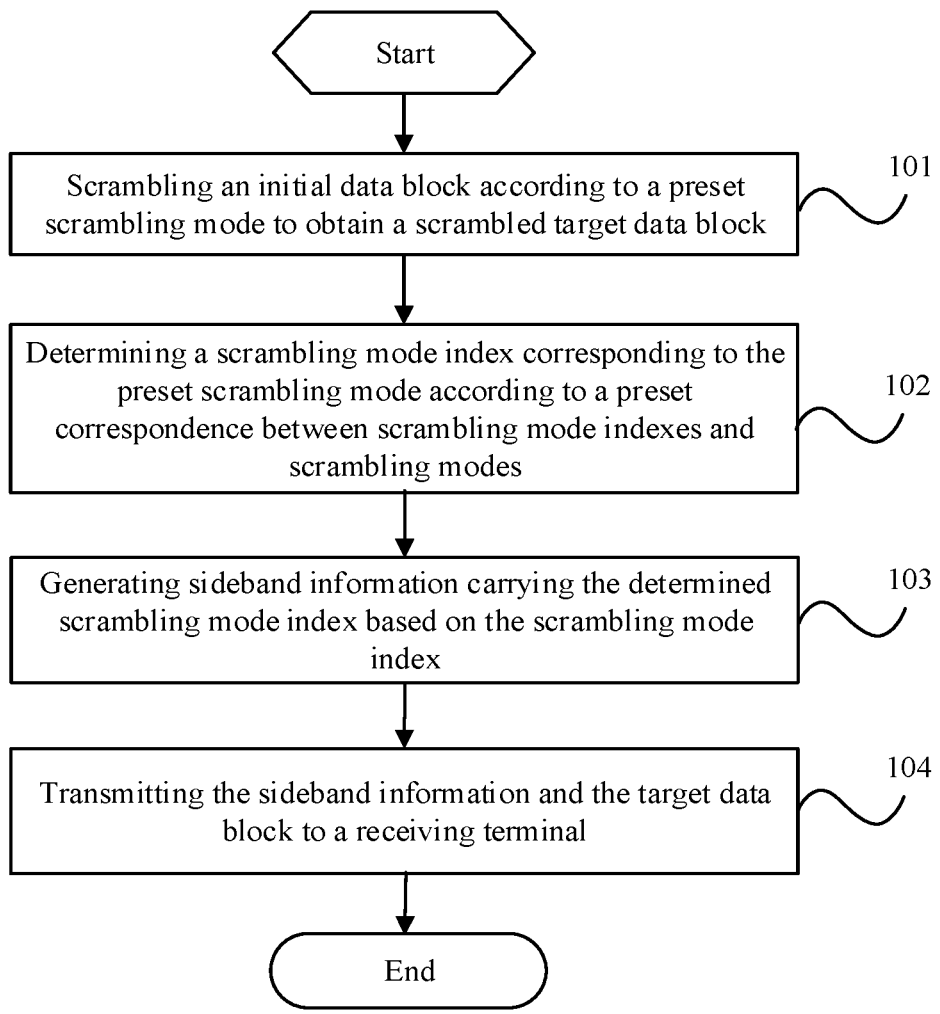
FIG. 1 is a flowchart of an information transmission method for reducing PAPR according to an embodiment of the present disclosure.

As shown in FIG. 1, an information transmission method for reducing PAPR is provided according to an embodiment of the present disclosure, which is applied to a transmitting terminal. The transmitting terminal is a user equipment for an uplink of a communication system, and is a base station for a downlink of the communication system. The information transmission method includes steps 101 to 104.

Step 101 includes: scrambling an initial data block according to a predetermined scrambling mode to obtain a scrambled target data block.

The initial data block herein may be a data block for bearing user data or a data block for bearing a control signaling.

Specifically, the above predetermined scrambling mode is a scrambling sequence, and PAPR during a data transmission process can be reduced by scrambling the initial data block with the scrambling sequence.

The above initial data block is obtained by encoding a data block. Further, prior to step 101, the method further includes obtaining the initial data block by encoding a data block.

The data block is encoded, thereby facilitating subsequent scrambling and transmission of the data block.

Step 102 includes: determining a scrambling mode index corresponding to the predetermined scrambling mode according to a predetermined relation between scrambling mode indexes and scrambling modes.

Herein, scrambling modes may be numbered in advance to obtain scrambling mode indexes of every scrambling modes, and the relation between the scrambling mode indexes and the scrambling modes is established, where the relation may be established by the transmitting terminal or a receiving terminal. The scrambling mode index corresponding to the predetermined scrambling mode is then determined according to the predetermined relation, so that the receiving terminal can obtain the scrambling mode used by the transmitting terminal with the scrambling mode index.

Step 103 includes: generating side information carrying the determined scrambling mode index based on the scrambling mode index.

Herein, the side information is generated based on the determined scrambling mode index, and the scrambling mode used by the transmitting terminal is reliably transmitted to the receiving terminal via the side information.

Step 104 includes: transmitting the side information and the target data block to a receiving terminal.

Herein, the side information carrying the scrambling mode index and the target data block are transmitted to the receiving terminal, and the receiving terminal obtains the scrambling mode of the target data block according to the side information and descrambles the target data block according to the scrambling mode as obtained, to obtain the initial data block.

In the information transmission method for reducing PAPR according to the embodiment of the present disclosure, a target data block is obtained by scrambling an initial data block according to a predetermined scrambling mode; a scrambling mode index corresponding to the predetermined scrambling mode is determined according to a predetermined relation between scrambling mode indexes and scrambling modes; side information carrying the determined scrambling mode index is generated based on the scrambling mode index; and the side information and the target data block are transmitted to a receiving terminal, thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

Figure 2:
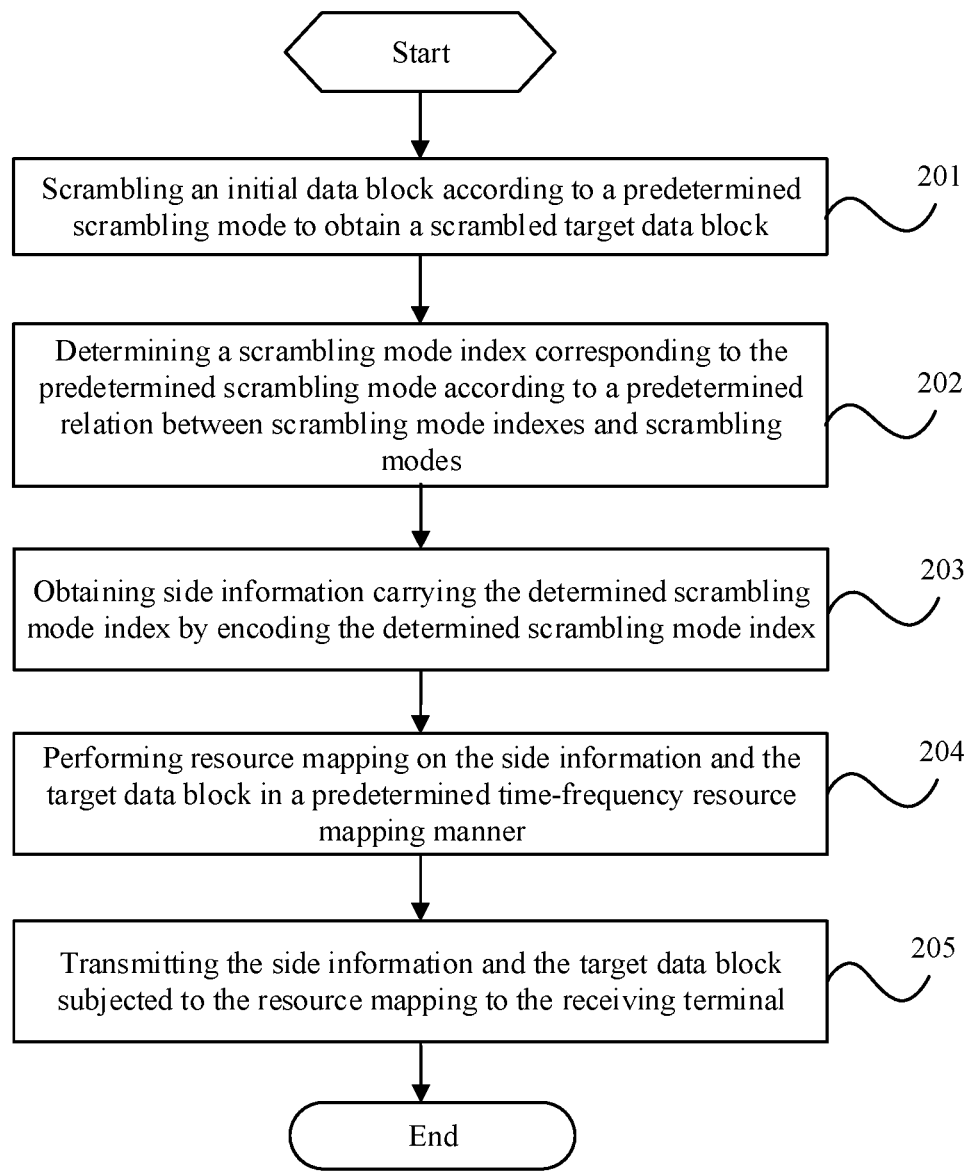
FIG. 2 is a flowchart of an information transmission method for reducing PAPR according to an embodiment of the present disclosure.

As shown in FIG. 2, an information transmission method for reducing PAPR is provided according to an embodiment of the present disclosure, which is applied to a transmitting terminal. The transmitting terminal is a user equipment for an uplink of a communication system, and is a base station for a downlink of the communication system. The information transmission method includes steps 201 to 204.

Step 201 includes: scrambling an initial data block according to a predetermined scrambling mode to obtain a scrambled target data block.

The initial data block referred to herein may be a data block for bearing user data or a data block for bearing a control signaling. The above initial data block is obtained by encoding a data block.

Specifically, the above predetermined scrambling mode is a scrambling sequence, and PAPR during a data transmission process can be reduced by scrambling the initial data block with the scrambling sequence.

Step 202 includes: determining a scrambling mode index corresponding to the predetermined scrambling mode according to a predetermined relation between scrambling mode indexes and scrambling modes.

Herein, scrambling modes can be numbered in advance to obtain a scrambling mode indexes of every scrambling modes, and a relation between the scrambling mode indexes and the scrambling modes is established, where the relation may be established by the transmitting terminal or a receiving terminal. The scrambling mode index corresponding to the predetermined scrambling mode is then determined according to the predetermined relation, so that the receiving terminal can obtain the scrambling mode used by the transmitting terminal with the scrambling mode index.

Step 203 includes: obtaining side information carrying the determined scrambling mode index by encoding the determined scrambling mode index.

Herein, after the scrambling mode index is determined, the scrambling mode index as determined can be encoded using a predetermined modulation encoding method.

Step 204 includes: performing resource mapping on the side information and the target data block in a predetermined time-frequency resource mapping manner.

Figure 3:
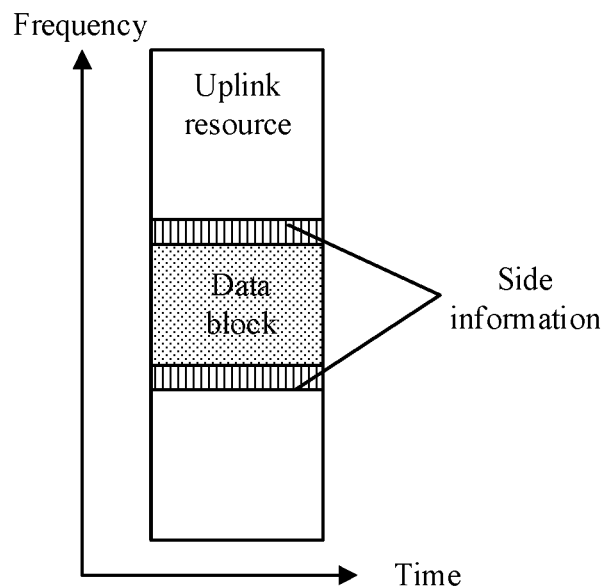
FIG. 3 is a schematic diagram of a first resource mapping of side information and a target data block in an information transmission method for reducing PAPR according to an embodiment of the present disclosure.
Figure 4:
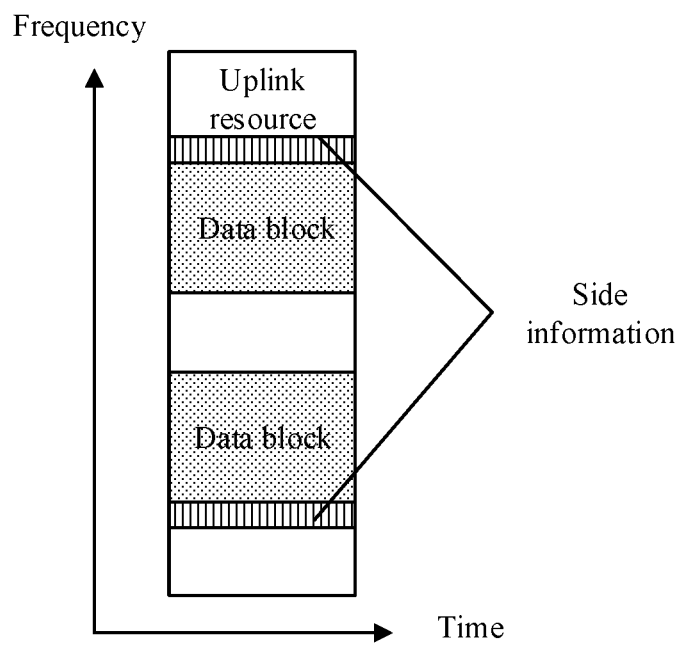
FIG. 4 is a schematic diagram of a first resource mapping of side information and a target data block in an information transmission method for reducing PAPR according to an embodiment of the present disclosure.

Specifically, as shown in FIGS. 3 and 4, the side information is mapped to two sub-bands adjacent to the target data block. The data block shown in FIG. 3 is continuously transmitted data, the data block shown in FIG. 4 is discontinuously transmitted data, and the data carried by the data block may be user data or a control signaling.

In the embodiment of the present disclosure, in a short-slot scenario, a better frequency diversity gain can be obtained by mapping the side information to two sub-bands immediately prior to and immediately subsequent to the data block.

Step 205 includes: transmitting the side information and the target data block subjected to the resource mapping to the receiving terminal.

Herein, the side information carrying the scrambling mode index and the target data block are transmitted to the receiving terminal, and the receiving terminal obtains the scrambling mode of the target data block according to the side information and descrambles the target data block according to the scrambling mode as obtained, to obtain the initial data block.

In the information transmission method for reducing PAPR according to the embodiment of the present disclosure, a target data block is obtained by scrambling an initial data block according to a predetermined scrambling mode; a scrambling mode index corresponding to the predetermined scrambling mode is determined according to a predetermined relation between scrambling mode indexes and scrambling modes; side information carrying the determined scrambling mode index is generated by encoding the scrambling mode index as determined; resource mapping is performed on the side information and the target data block in a predetermined way of time frequency mapping; and the side information and the target data block which have been subjected to resource mapping are transmitted to a receiving terminal, thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

Figure 5:
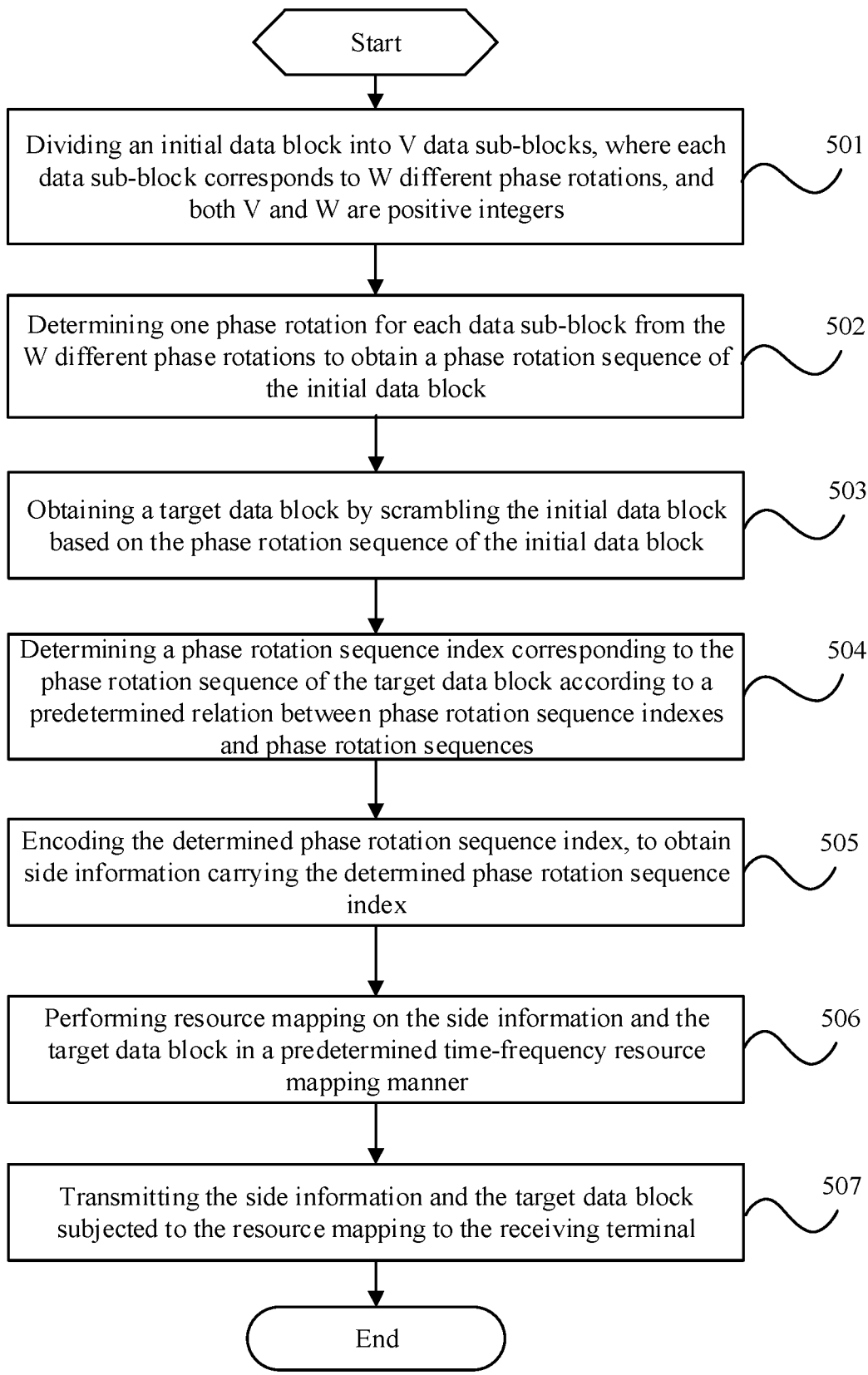
FIG. 5 is a flowchart of an information transmission method for reducing PAPR according to an embodiment of the present disclosure.

As shown in FIG. 5, an information transmission method for reducing PAPR is further provided according to an embodiment of the present disclosure, which is applied to a transmitting terminal. The transmitting terminal is a user equipment for an uplink of a communication system and is a base station for a downlink of the communication system. The information transmission method includes steps 501 to 507.

Step 501 includes: dividing an initial data block into V data sub-blocks, where each data sub-block corresponds to W different phase rotations, and both V and W are positive integers.

Assuming dividing a data vector with a length of N into V sub-vectors $X_V$ that do not overlap with each other, a length of each sub-vector is N/V. A final value of a phase rotation of each branch after IFFT is applied is noted as $b_v = e^{j\phi_v}$, where $\phi_v$ is the phase rotation and $$\phi_v = \frac{2\pi i}{W},$$

i is selected from 0, 1, 2, ... W−1, and $j=\sqrt{-1}$ is the imaginary unit.

Herein, the data block is divided into multiple non-overlapping data sub-blocks, reducing interference between the data sub-blocks.

Step 502 includes: determining one phase rotation for each data sub-block from the W different phase rotations to obtain a phase rotation sequence of the initial data block.

As each branch may be selected from W different phase rotations and there are V−1 branches in all (for typically, a phase rotation of a first branch is assumed to be 0), $W^{V-1}$ different phase rotation combinations are available in total. If all the $W^{V-1}$ different phase rotation combinations above are as candidates, $\lceil (V-1)\log_2 W \rceil$ bits are required to carry the information, where $\lceil x \rceil$ represents a ceiling operation on a real number x.

The phase rotation is numbered in the following manner. In Table 1, m represents a phase rotation combination index, n represents a branch index, i represents a phase rotation index of each branch, and a phase rotation of the branch corresponding to i is $$\frac{2\pi i}{W}.$$

TABLE 1

| n | m | | | | | | | | | |
|---|---|---|---|---|---|---|---|---|---|---|
|  | 0 | 1 | ... W−1 | W | W+1 | ... 2W−1 | 2W | 2W+1 | ... 3W−1 |
|  | | | | i | | | | | |
| Branch 0 | 0 | 0 | ... 0 | 0 | 0 | ... 0 | 0 | 0 | ... 0 |
| Branch 1 | 0 | 0 | ... 0 | 0 | 0 | ... 0 | 0 | 0 | ... 0 |
| Branch 2 | 0 | 0 | ... 0 | 0 | 0 | ... 0 | 0 | 0 | ... 0 |
| Branch 3 | 0 | 0 | ... 0 | 0 | 0 | ... 0 | 0 | 0 | ... 0 |
| ... | 0 | 0 | ... 0 | 1 | 1 | ... 1 | 2 | 2 | ... 2 |
| Branch V−1 | 0 | 1 | ... W−1 | 0 | 1 | ... W−1 | 0 | 1 | ... W−1 |
| Index | 3W | 3W+1 | ... 4W−1 | $W^{V-1}$ − (2W−1) | ... | ... $W^{V-1}$ − W | ... | ... | ... $W^{V-1}$ − 1 |
| Branch 0 | 0 | 0 | ... 0 | W−2 | W−2 | ... W−2 | ... | W−1 | ... W−1 |
| Branch 1 | 0 | 0 | ... 0 | W−2 | W−2 | ... W−2 | ... | W−1 | ... W−1 |
| Branch 2 | 0 | 0 | ... 0 | W−2 | W−2 | ... W−2 | ... | W−1 | ... W−1 |
| Branch 3 | 0 | 0 | ... 0 | W−2 | W−2 | ... W−2 | ... | W−1 | ... W−1 |
| ... | 3 | 3 | ... 3 | W−2 | W−2 | ... W−2 | ... | W−1 | ... W−1 |
| Branch V−1 | 0 | 1 | ... W−1 | 0 | 1 | ... W−1 | 0 | 1 | ... W−1 |

The mapping relationship above is mathematically expressed as follows.

Assuming that a phase rotation sequence of the data vector above is $[0, i_1, i_2, i_3, \ldots, i_{V-1}]$, a corresponding index is $$\sum_{v=1}^{V-1} i_v \cdot W^{V-v-1}.$$

Generally, the index is encoded into binary $\lceil (v-1)\log_2 W \rceil$ bits, which are [o0, o1, o2, ..., oN−1] (converted in a manner of MSB (Most Significant Bit) first or LSB (Least Significant Bit) first), where $N = \lceil (V-1)\log_2 W \rceil$.

At the receiving terminal, in a case that it is known the phase rotation sequence above is encoded into a binary sequence $[o_0, o_1, o_2, \ldots o_{N-1}]$ and a corresponding decimal number is Z, the phase rotation of each branch is given by:

$$i_v = \begin{cases} Z \bmod W^v & v = 1, 2, \ldots V-1 \\ 0 & v = 0 \end{cases},$$

where mod is the modulo operation.

The phase rotation sequence in the embodiment of the present disclosure includes the phase rotation of each branch, which facilitates scrambling each branch of the initial data block based on the phase rotation of each branch.

Step 503 includes: obtaining a target data block by scrambling the initial data block based on the phase rotation sequence of the initial data block.

In the embodiment of the present disclosure, the data block is scrambled based on the phase rotation sequence determined in advance, which reduces PAPR of an OFDM system.

Step 504 includes: determining a phase rotation sequence index corresponding to the phase rotation sequence of the target data block according to a predetermined relation between phase rotation sequence indexes and phase rotation sequences.

In a particular embodiment of the present disclosure, before the initial data block is scrambled, a phase rotation sequence set composed of W v phase rotation sequences corresponding to the data block or subsets of the phase rotation sequence set are numbered, to obtain phase rotation sequence indexes of the phase rotation sequences of the initial data block above. Thereafter, a corresponding phase rotation sequence is selected to scramble the initial data block and a index of the selected phase rotation sequence is determined, so that the receiving terminal can obtain the phase rotation sequence used by the transmitting terminal with the index.

Step 505 includes: encoding the determined phase rotation sequence index, to obtain side information carrying the determined phase rotation sequence index.

The side information according to the embodiment of the present disclosure includes a placeholder.

Herein, after the phase rotation sequence index corresponding to the selected phase rotation sequence is determined, the phase rotation sequence index may be encoded in the modulation encoding manner as shown in Table 2, for example, ½ encoding:

TABLE 2

| $Q_m$ | Bits after encoding |
|---|---|
| 2 | $[o_0, o_1, o_2, \ldots o_{N-1}, o_0, o_1, o_2, \ldots o_{N-1}]$ |
| 4 | $[o_0, o_1, x, x, o_2, o_3, x, x, \ldots o_{N-1}, x, x,$ $o_0, o_1, x, x, o_2, \ldots o_{N-1}]$ |
| 6 | $[o_0, o_1, x, x, x, x, o_2, o_3, x, x, x, x \ldots o_{N-1},$ $x, x, x, x, o_0, o_1, x, x, x, x, o_2, \ldots o_{N-1}]$ | where $Q_m$ is an order of modulation, and x is a placeholder which is determined in accordance with basic encoding standards, for example, in a manner that maximizes Euclidean distances between the bits after encoding.

Step 506 includes: performing resource mapping on the side information and the target data block in a predetermined time-frequency resource mapping manner.

Specifically, the side information is mapped to two sub-bands adjacent to the target data block. As shown in FIGS. 3 and 4, the side information is mapped to two sub-bands adjacent to the target data block. The data block shown in FIG. 3 is continuously transmitted data, the data block shown in FIG. 4 is discontinuously transmitted data, and the data carried by the data block may be user data or a control signaling.

In the embodiment of the present disclosure, in a short-slot scenario, a better frequency diversity gain can be obtained by mapping the side information to two sub-bands immediately before and after the data block.

Step 507 includes transmitting the side information and the target data block subjected to the resource mapping to the receiving terminal.

Herein, the side information carrying the scrambling mode index and the target data block are transmitted to the receiving terminal, and the receiving terminal obtains the scrambling mode of the target data block according to the side information and descrambles the target data block according to the scrambling mode as obtained, to obtain the initial data block.

In the embodiment of the present disclosure, an initial data block is divided into V data sub-blocks, where each data sub-block corresponds to W different phase rotations; one phase rotation for each data sub-block is determined from the W different phase rotations to obtain a phase rotation sequence of the initial data block; a target data block is obtained by scrambling the initial data block based on the phase rotation sequence of the initial data block; a phase rotation sequence index corresponding to the phase rotation sequence of the target data block is determined according to a predetermined relation between phase rotation sequence indexes and phase rotation sequences; the phase rotation sequence index as determined is encoded, to obtain side information carrying the phase rotation sequence index as determined; resource mapping is performed on the side information and the target data block in a predetermined time-frequency resource mapping manner; and the side information and the target data block subjected to the resource mapping are transmitted to a receiving terminal. In the present disclosure, PAPR of an OFDM system is reduced by a method of partial transmission sequence, and the objective of reliably transmitting side information to a receiving terminal is achieved.

Figure 6:
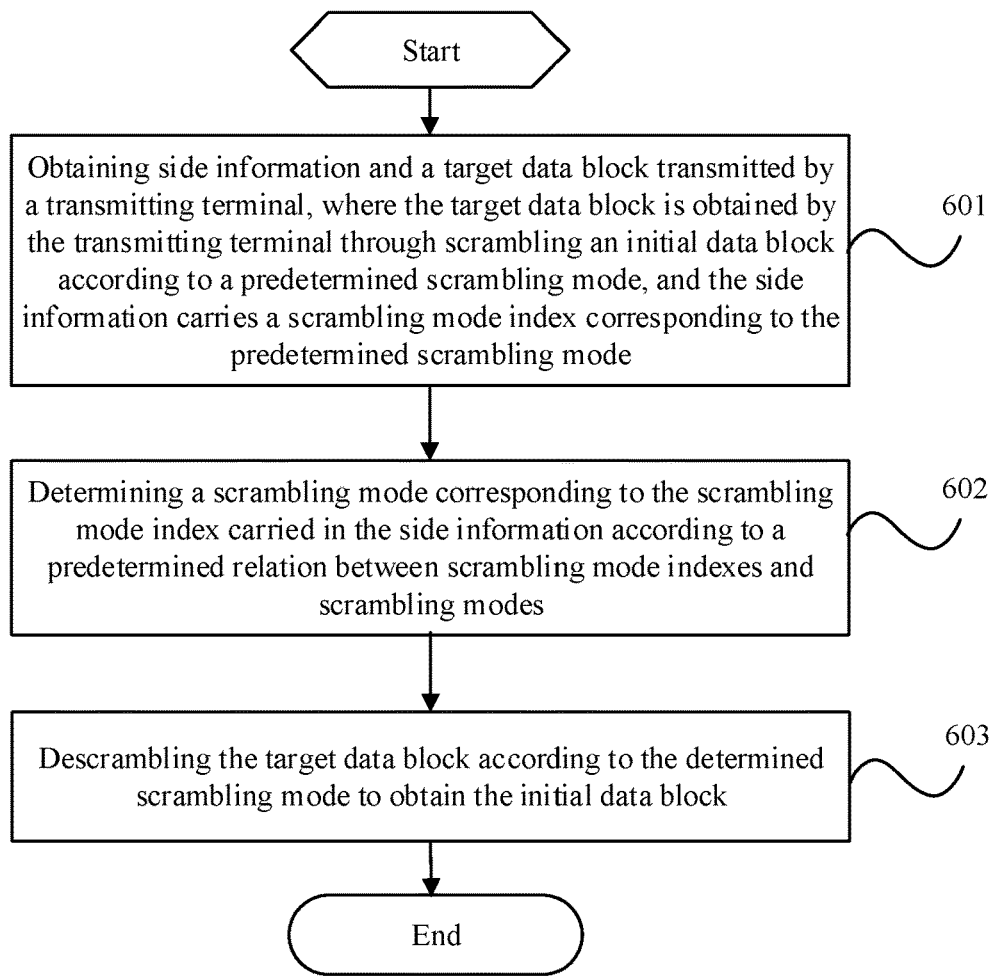
FIG. 6 is a flowchart of an information transmission method for reducing PAPR according to an embodiment of the present disclosure.

As shown in FIG. 6, an information transmission method for reducing PAPR is further provided according to an embodiment of the present disclosure, which is applied to a receiving terminal. The receiving terminal is a base station for an uplink of a communication system and is a user equipment for a downlink of the communication system. The information transmission method includes steps 601 to 603.

Step 601 includes: obtaining side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode.

Specifically, the side information above is obtained from two sub-bands adjacent to the target data block above in a predetermined time-frequency resource mapping manner, where the predetermined time-frequency resource mapping manner is mapping the side information to the two sub-bands adjacent to the target data block.

Herein, the side information and the target data block are obtained, so as to determine the scrambling mode used by the transmitting terminal when scrambling the data block according to the scrambling mode index carried in the side information.

Step 602 includes: determining a scrambling mode corresponding to the scrambling mode index carried in the side information according to a predetermined relation between scrambling mode indexes and scrambling modes.

Specifically, a phase rotation sequence corresponding to a phase rotation sequence index carried in the side information is determined according to a predetermined relation between phase rotation sequence indexes and phase rotation sequences.

Herein, the scrambling mode corresponding to the scrambling mode index carried in the side information is determined, so as to descramble the target data block according to the scrambling mode as determined.

As the transmitting terminal needs to encode the side information before transmitting the side information, the receiving terminal needs to decode the side information accordingly after receiving the side information. In this case, before step 602, the information transmission method for reducing PAPR according to the embodiment of the present disclosure further includes: decoding the side information to obtain the scrambling mode index carried in the side information.

Step 603 includes descrambling the target data block according to the determined scrambling mode to obtain the initial data block.

Herein, the receiving terminal can accurately descramble the target data block according to the scrambling mode.

Further, after step 603, the information transmission method for reducing PAPR according to the embodiment of the present disclosure further includes:

decoding the initial data block to obtain a data block, where the initial data block is obtained by the transmitting terminal through encoding the data block.

To guarantee reliability of transmission, the transmitting terminal first encodes the data block to obtain the initial data block and then scrambles the initial data block to obtain the target data block. Therefore, the receiving terminal needs to first descramble the target data block to obtain the initial data block and then decode the initial data block to obtain the data block.

In the information transmission method for reducing PAPR according to the embodiment of the present disclosure, side information and a target data block transmitted by a transmitting terminal is received by a receiving terminal, where the target data block is obtained by the transmitting terminal through scrambling an initial data block according to a predetermined scrambling mode, and the side information carries a scrambling mode index corresponding to the predetermined scrambling mode; a scrambling mode corresponding to the scrambling mode index carried in the side information is determined according to a predetermined relation between scrambling mode indexes and scrambling modes; and the initial data block is obtained by descrambling the target data block according to the scrambling mode as determined. The receiving terminal in the embodiment of the present disclosure can reliably receive the side information transmitted by a transmitting terminal, obtain the scrambling mode of the target data block according to the side information and obtain the data block by descrambling the target data block according to the scrambling mode as obtained.

Figure 7:
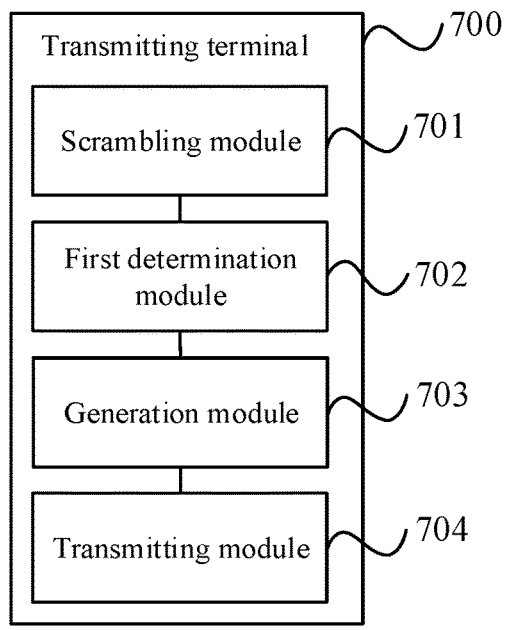
FIG. 7 is a schematic structural diagram of a transmitting terminal according to an embodiment of the present disclosure.

As shown in FIG. 7, a transmitting terminal 700 is further provided according to an embodiment of the present disclosure, which includes:

a scrambling module 701, configured to scramble an initial data block according to a predetermined scrambling mode to obtain a scrambled target data block;

a first determination module 702, configured to determine a scrambling mode index corresponding to the predetermined scrambling mode according to a predetermined relation between scrambling mode indexes and scrambling modes;

a generation module 703, configured to generate side information carrying the scrambling mode index as determined based on the scrambling mode index; and a transmitting module 704, configured to transmit the side information and the target data block to a receiving terminal.

Figure 8:
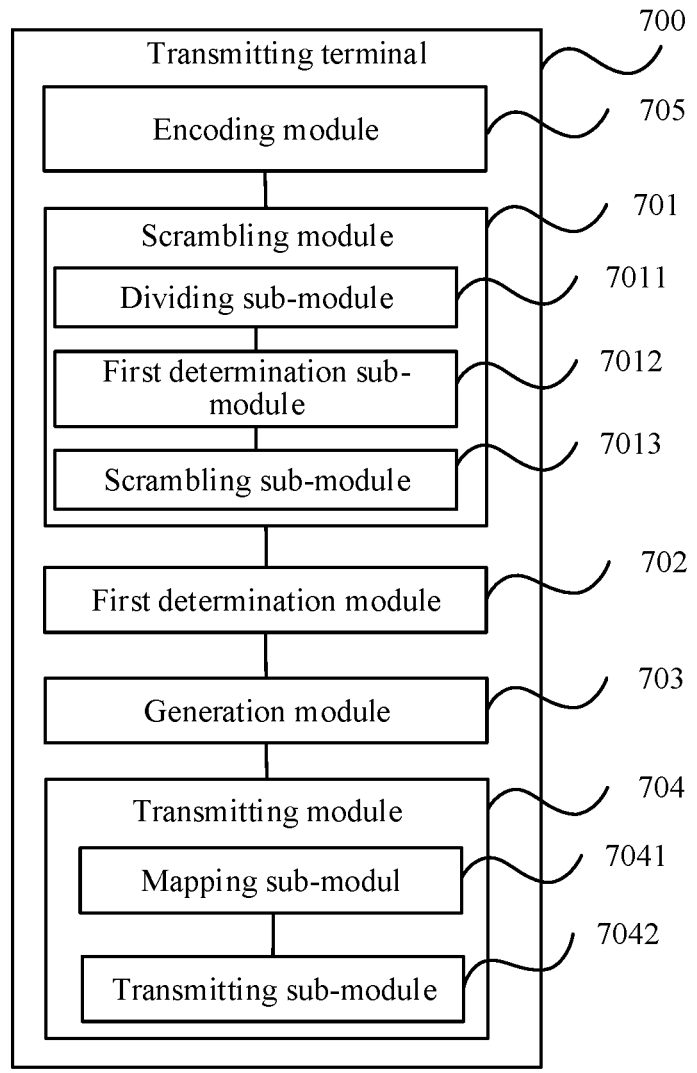
FIG. 8 is a schematic structural diagram of a transmitting terminal according to an embodiment of the present disclosure.

In an embodiment of the present disclosure as shown in FIG. 8, the transmitting terminal further includes:

an encoding module 705, configured to obtain the initial data block by encoding a data block.

In the embodiment of the present disclosure as shown in FIG. 8, the scrambling module 701 includes:

a dividing sub-module 7011, configured to divide the initial data block into V data sub-blocks, where each data sub-block corresponds to W different phase rotations, and both V and W are positive integers;

a first determination sub-module 7012, configured to determine one phase rotation for each data sub-block from the W different phase rotations to obtain a phase rotation sequence of the initial data block; and a scrambling sub-module 7013, configured to obtain the target data block by scrambling the initial data block based on the phase rotation sequence of the initial data block.

In the transmitting terminal according to the embodiment of the present disclosure, the first determination module 702 is specifically configured to determine a phase rotation sequence index corresponding to the phase rotation sequence of the target data block according to a predetermined relation between phase rotation sequence indexes and phase rotation sequences.

In the transmitting terminal according to the embodiment of the present disclosure, the generation module 703 is specifically configured to encode the scrambling mode index as determined, to obtain the side information carrying the scrambling mode index as determined.

In the transmitting terminal according to the embodiment of the present disclosure, the transmitting module 704 includes:

a mapping sub-module 7041, configured to perform resource mapping on the side information and the target data block in a predetermined time-frequency resource mapping manner; and a transmitting sub-module 7042, configured to transmit the side information and the target data block subjected to the resource mapping to the receiving terminal.

The transmitting terminal according to the embodiments of the present disclosure obtains a target data block by scrambling an initial data block according to a predetermined scrambling mode, determines a scrambling mode index corresponding to the predetermined scrambling mode according to a predetermined relation between scrambling mode index and scrambling mode, generates side information carrying the scrambling mode index based on the scrambling mode index, and transmits the side information and the target data block to a receiving terminal, thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

Figure 9:
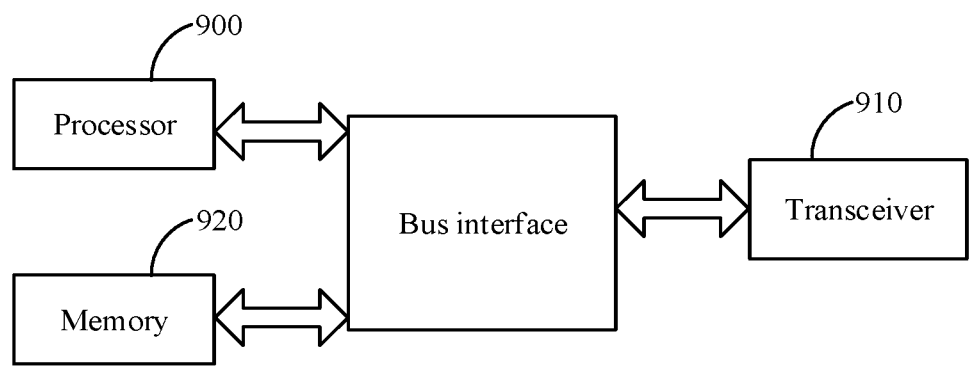
FIG. 9 is a schematic structural diagram of a transmitting terminal according to an embodiment of the present disclosure.

In an embodiment of the present disclosure, the transmitting terminal is a base station. As shown in FIG. 9, the base station includes: a processor 900, a memory 920 connected to the processor 900 through a bus interface, and a transceiver 910 connected to the processor 900 through the bus interface. The memory 902 is configured to store a program and data used by the processor when performing operations. The transceiver 910 transmits data information or pilots and receives uplink control channels. The processor 900 is configured to transmit scheduling information carrying numerical configuration information to a user equipment when revoking and executing the program and data stored in the memory 920.

The processor 900 is configured to read the program stored in the memory 920 to perform the following process: obtaining a target data block by scrambling an initial data block according to a predetermined scrambling mode; determining a scrambling mode index corresponding to the predetermined scrambling mode according to a predetermined relation between scrambling mode indexes and scrambling modes; generating side information carrying the scrambling mode index as determined based on the scrambling mode index; and transmitting the side information and the target data block to a receiving terminal.

Optionally, the processor 900 is further configured to obtain the initial data block by encoding a data block.

Optionally, the processor 900 is further configured to: divide the initial data block into V data sub-blocks, where each data sub-block corresponds to W different phase rotations, and both V and W are positive integers; determine one phase rotation for each data sub-block from the W different phase rotations to obtain a phase rotation sequence of the initial data block; and obtain the target data block by scrambling the initial data block based on the phase rotation sequence of the initial data block.

Optionally, the processor 900 is further configured to determine a phase rotation sequence index corresponding to the phase rotation sequence of the target data block according to a predetermined relation between phase rotation sequence indexes and phase rotation sequences.

Optionally, the processor 900 is further configured to encode the scrambling mode index as determined, to obtain the side information carrying the scrambling mode index as determined.

Optionally, the processor 900 is further configured to perform resource mapping on the side information and the target data block in a predetermined time-frequency resource mapping manner; and transmit the side information and the target data block subjected to the resource mapping to the receiving terminal.

Optionally, the processor 900 is further configured to map the side information to two sub-bands adjacent to the target data block.

The bus architecture in FIG. 9 may include any number of interconnected buses and bridges, which links various circuits such as one or multiple processors represented by the processor 900 and memories represented by the memory 920. The bus architecture can also link other circuit components such as an external device, a voltage stabilizer and a power management circuit, which is common knowledge in the art and therefore is not described in further detail. The bus interface provides interfaces. The transceiver 910 may include multiple components, namely a transmitter and a receiver, which provides means for communication with other devices on a transmission medium. The processor 900 is responsible for management of the bus architecture and general processing, and the memory 920 may store the data used by the processor 900 in performing operations.

In this way, the base station obtains a target data block by scrambling an initial data block according to a predetermined scrambling mode, determines a scrambling mode index corresponding to the predetermined scrambling mode according to a predetermined relation between scrambling mode indexes and scrambling modes, generates side information carrying the determined scrambling mode index based on the scrambling mode index, and transmits the side information and the target data block to a receiving terminal (for example, user equipment), thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

Moreover, it should be noted that in the device and method of the present disclosure, it is apparent that the various components or steps may be decomposed and/or recombined. These decompositions and/or recombinations should be considered as equivalents to the present disclosure. Also, the steps of the above-described processes may naturally be performed in chronological order according to the order of description, but are not necessarily to be performed in chronological order, and some steps may be performed in parallel or independently of each other. It will be appreciated by those skilled in the art that all or any of the steps or components of the methods and device of the present disclosure may be implemented in the form of hardware, firmware, software or combinations thereof in any computing device (including a processor, storage medium, etc.) or a network of computing devices, which can be achieved by those of ordinary skill in the art using their basic programming skills after reading the description of the present disclosure.

Therefore, the objective of the present disclosure can also be achieved by running a program or a set of programs on any computing device. The computing device may be a well-known general-purpose device. Accordingly, the objective of the present disclosure may also be realized by merely providing a program product including program codes for implementing the method or device. That is to say, such a program product also falls within the scope of the present disclosure, and a storage medium storing such a program product also falls within the scope of the present disclosure. It is apparent that the storage medium may be any known storage medium or any storage medium developed in the future. It should also be noted that in the device and method of the present disclosure, it is apparent that various components or steps may be decomposed and/or recombined. These decompositions and/or recombinations should be considered as equivalents to the present disclosure. Also, the steps of the processes described above may naturally be performed in chronological order according to the order of description, but are not necessarily to be performed in chronological order. Some steps may be performed in parallel or independently of one another.

Figure 10:
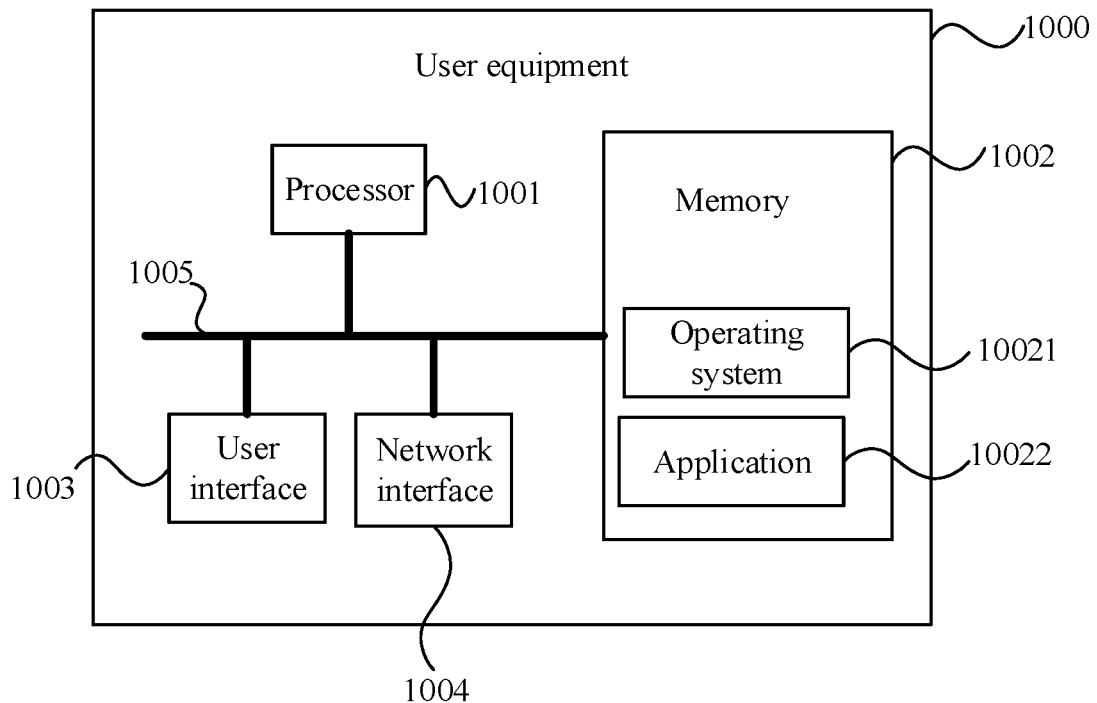
FIG. 10 is a schematic structural diagram of a transmitting terminal according to an embodiment of the present disclosure.

In an embodiment of the present disclosure, the transmitting terminal is a user equipment. Reference is made to FIG. 10, which is a structural block diagram of the user equipment according to the embodiment of the present disclosure. The user equipment 1000 in FIG. 10 includes: at least one processor 1001, a memory 1002, at least one network interface 1004 and other user interfaces 1003. The components of the user equipment 1000 are coupled together by a bus system 1005. Understandably, the bus system 1005 is configured to implement connection and communication between or among the components. In addition to a data bus, the bus system 1005 further includes a power supply bus, a control bus and a state signal bus. For clarification considerations, the various buses are denoted by the bus system 1005 in FIG. 10.

The user interfaces 1003 may include a display, a keyboard, or a click device (e.g., a mouse, a trackball, a touchpad, or a touch screen).

It is understandable that the memory 1002 in the embodiments of the present disclosure may be a volatile memory or a non-volatile memory, or may include both volatile and non-volatile memory. The non-volatile memory may be a read-only memory (Read-Only Memory, ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (Random Access Memory, RAM) that acts as a high-speed external cache. By way of example and not limitation, many kinds of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink connection dynamic random access memory (Synchlink DRAM, SDRAM) and direct memory bus random access memory (Direct Rambus RAM, DRRAM). The memory 1002 of the systems and methods described herein is intended to include, without being limited to, these and any other suitable types of memories.

In some implementations, the memory 1002 stores elements, executable modules or data structures, or a subset thereof, or an extended set thereof such as an operating system 10021 and an application 10022.

The operating system 10021 includes various system programs, such as a framework layer, a core library layer, a driver layer, and the like, for implementing various basic services and processing hardware-based tasks. The application 10022 includes various applications, such as a media player (Media Player), a browser (Browser), and the like, for implementing various application services. A program implementing the method of the embodiments of the present disclosure may be included in the application 10022.

In an embodiment of the present disclosure, by revoking a program or instructions stored in the memory 1002, specifically, the program or instructions stored in the application 10022, the processor 1001 is configured to: obtain a target data block by scrambling an initial data block according to a predetermined scrambling mode; determine a scrambling mode index corresponding to the predetermined scrambling mode according to a predetermined relation between scrambling mode indexes and scrambling modes; generate side information carrying the scrambling mode index as determined based on the scrambling mode index; and transmit the side information and the target data block to a receiving terminal.

Optionally, the processor 1001 is further configured to obtain the initial data block by encoding a data block.

Optionally, the processor 1001 is further configured to: divide the initial data block into V data sub-blocks, where each data sub-block corresponds to W different phase rotations, and both V and W are positive integers; determine one phase rotation for each data sub-block from the W different phase rotations and obtain a phase rotation sequence of the initial data block; and obtain the target data block by scrambling the initial data block based on the phase rotation sequence of the initial data block.

Optionally, the processor 1001 is further configured to determine a phase rotation sequence index corresponding to the phase rotation sequence of the target data block according to a predetermined relation between phase rotation sequence indexes and phase rotation sequences.

Optionally, the processor 1001 is further configured to encode the scrambling mode index as determined, to obtain side information carrying the scrambling mode index as determined.

Optionally, the processor 1001 is further configured to perform resource mapping on the side information and the target data block in a predetermined time-frequency resource mapping manner; and transmit the side information and the target data block subjected to the resource mapping to the receiving terminal.

Optionally, the processor 1001 is further configured to map the side information to two sub-bands adjacent to the target data block.

In the user equipment 1000 according to the embodiments of the present disclosure, the processor 1001 is configured to: obtain a target data block by scrambling an initial data block according to a predetermined scrambling mode; determine a scrambling mode index corresponding to the predetermined scrambling mode according to a predetermined relation between scrambling mode indexes and scrambling modes; generate side information carrying the scrambling mode index as determined based on the scrambling mode index; and transmit the side information and the target data block to a receiving terminal (for example, user equipment), thereby achieving reliably transmitting the side information carrying scrambling information to the receiving terminal. In such a manner, the receiving terminal obtains the scrambling mode of the target data block according to the side information and obtains the initial data block by descrambling the target data block according to the obtained scrambling mode, thereby reducing PAPR of an OFDM system.

The user equipment according to the present disclosure may be a cellphone, a tablet computer, a personal digital assistant (Personal Digital Assistant, PDA), or an on-board computer.

The user equipment 1000 can implement the processes performed by the user equipment according to the foregoing embodiments, which is not redundantly described for purpose of conciseness.

All the methods according to the foregoing embodiments of the present disclosure can be applied to the processor 1001, or implemented by the processor 1001. The processor 1001 may be an integrated circuit chip with signal processing capabilities. In implementation, each step of the foregoing methods may be completed by an integrated logic circuit in form of hardware in the processor 1001 or instructions in form of software. The processor 1001 above may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or any other programmable logic device, a discrete gate, a transistor logic device or a discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module can be located in a conventional storage medium such as a random access memory, a flash memory, a read-only memory, a programmable read-only memory, an electrically erasable programmable memory, a registers, or the like. The storage medium is located in the memory 1002, and the processor 1001 reads the information in the memory 1002 and completes the steps of the above methods in combination with its hardware.

It is appreciated that the embodiments described herein can be implemented in hardware, software, firmware, middleware, microcode, or a combination thereof. For hardware implementation, the processing unit can be implemented in one or more application specific integrated circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general purpose processors, controllers, microcontrollers, microprocessors, other electronics units for performing the functions according to the present disclosure or combinations of the above.

For software implementation, the technical solutions according to the present disclosure can be implemented by modules (e.g., processes, functions, and so on) for performing the functions according to the present disclosure. The software code can be stored in the memory and executed by the processor, and the memory can be implemented in the processor or outside the processor.

Figure 11:
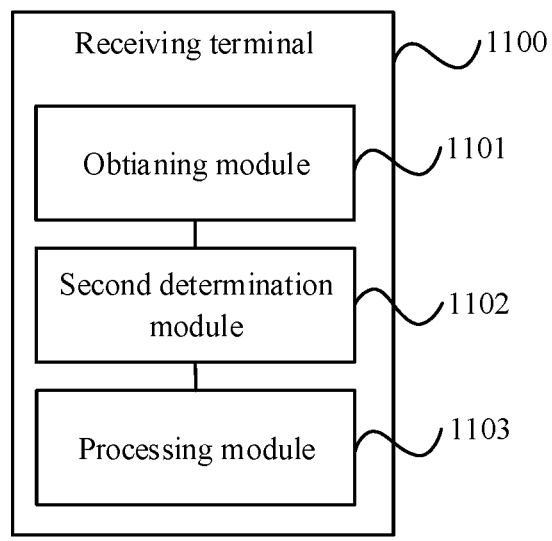
FIG. 11 is a schematic structural diagram of a receiving terminal according to an embodiment of the present disclosure.

As shown in FIG. 11, a receiving terminal 1100 is provided according to an embodiment of the present disclosure, which includes:

an obtaining module 1101, configured to obtain side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode;

a second determination module 1102, configured to determine a scrambling mode corresponding to the scrambling mode index carried in the side information according to a predetermined relation between scrambling mode indexes and scrambling modes; and a processing module 1103, configured to obtain the initial data block by descrambling the target data block according to the scrambling mode as determined.

In an embodiment of the present disclosure, the obtaining module 1101 in the receiving terminal is specifically configured to obtain the side information from two sub-bands adjacent to the target data block above in a predetermined time-frequency resource mapping manner, where the predetermined time-frequency resource mapping manner is mapping the side information to the two sub-bands adjacent to the target data block.

Figure 12:
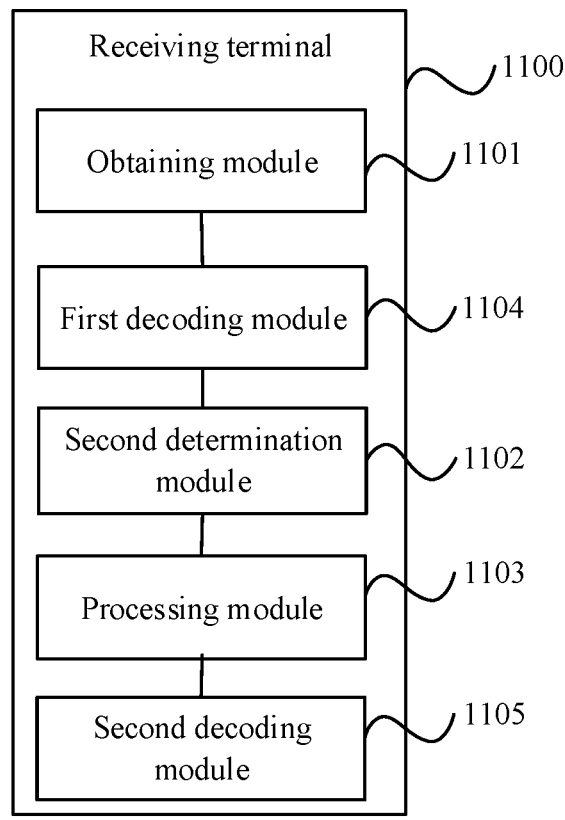
FIG. 12 is a schematic structural diagram of a receiving terminal according to an embodiment of the present disclosure.

As shown in FIG. 12, in an embodiment of the present disclosure, the receiving terminal further includes:

a first decoding module 1104, configured to decode the side information to obtain the scrambling mode index carried in the side information.

In an embodiment of the present disclosure, the second determination module 1102 of the receiving terminal is specifically configured to determine a phase rotation sequence corresponding to a phase rotation sequence index carried in the side information according to a predetermined relation between phase rotation sequence indexes and phase rotation sequences.

In an embodiment of the present disclosure, the receiving terminal further includes:

a second decoding module 1105, configured to decode the initial data block to obtain a data block, where the initial data block is obtained by the transmitting terminal through encoding the data block.

The receiving terminal according to the embodiments of the present disclosure obtains side information and a target data block transmitted by a transmitting terminal, where the target data block is obtained by the transmitting terminal through scrambling an initial data block according to a predetermined scrambling mode and the side information carries a scrambling mode index corresponding to the predetermined scrambling mode, determines a scrambling mode corresponding to the scrambling mode index carried in the side information according to a predetermined relation between scrambling mode indexes and scrambling modes, and obtains the initial data block by descrambling the target data block according to the scrambling mode as determined. The receiving terminal according to the embodiments of the present disclosure can reliably receive the side information transmitted by a transmitting terminal, obtain the scrambling mode of the target data block according to the side information and obtain the data block by descrambling the target data block according to the scrambling mode as obtained.

Figure 13:
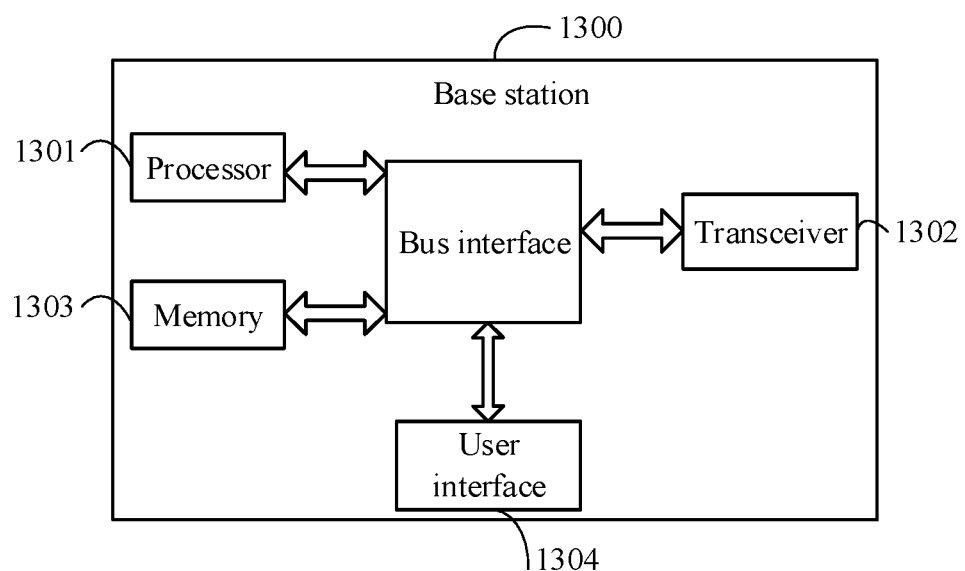
FIG. 13 is a schematic structural diagram of a receiving terminal according to an embodiment of the present disclosure.

In an embodiment of the present disclosure, the receiving terminal is a base station. As shown in FIG. 13, the base station includes: a processor 1301, a transceiver 1302, a memory 1303, a user interface 1304 and a bus interface.

The processor 1301 is configured to read a program stored in the memory 1303 to perform the following process: obtaining side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode; determining a scrambling mode corresponding to the scrambling mode index carried in the side information according to a predetermined relation between scrambling mode indexes and scrambling modes; and obtaining the initial data block by descrambling the target data block according to the scrambling mode as determined.

The bus architecture in FIG. 13 may include any number of interconnected buses and bridges, which links various circuits such as one or multiple processors represented by the processor 1301 and memories represented by the memory 1303. The bus architecture can also link other circuit components such as an external device, a voltage stabilizer and a power management circuit, which is common knowledge in the art and therefore is not described in further detail. The bus interface provides interfaces. The transceiver 1302 may include multiple components, namely a transmitter and a receiver, which provides means for communication with other devices on a transmission medium. Depending on the user device, the user interface 1304 may be an interface for connecting an external or an internal device, which includes, but not limited to, a keypad, a display, a loudspeaker, a microphone or a joystick.

The processor 1301 is responsible for management of the bus architecture and general processing, and the memory 1303 may store the data used by the processor 1301 in performing operations.

Optionally, the processor 1301 is further configured to obtain the side information from two sub-bands adjacent to the target data block above in a predetermined time-frequency resource mapping manner, where the predetermined time-frequency resource mapping manner is mapping the side information to the two sub-bands adjacent to the target data block.

Optionally, the processor 1301 is further configured to decode the side information to obtain the scrambling mode index carried in the side information.

Optionally, the processor 1301 is further configured to determine a phase rotation sequence corresponding to a phase rotation sequence index carried in the side information according to a predetermined relation between phase rotation sequence indexes and phase rotation sequences.

Optionally, the processor 1301 is further configured to decode the initial data block to obtain a data block, where the initial data block is obtained by the transmitting terminal through encoding the data block.

The based station according to the embodiments of the present disclosure obtains side information and a target data block transmitted by a transmitting terminal, where the target data block is obtained by the transmitting terminal through scrambling an initial data block according to a predetermined scrambling mode and the side information carries a scrambling mode index corresponding to the predetermined scrambling mode, determines a scrambling mode corresponding to the scrambling mode index carried in the side information according to a predetermined relation between scrambling mode indexes and scrambling modes, and obtains the initial data block by descrambling the target data block according to the scrambling mode as determined. The receiving terminal according to the embodiments of the present disclosure can reliably receive the side information transmitted by a transmitting terminal, obtain the scrambling mode of the target data block according to the side information and obtain the data block by descrambling the target data block according to the scrambling mode as obtained.

Figure 14:
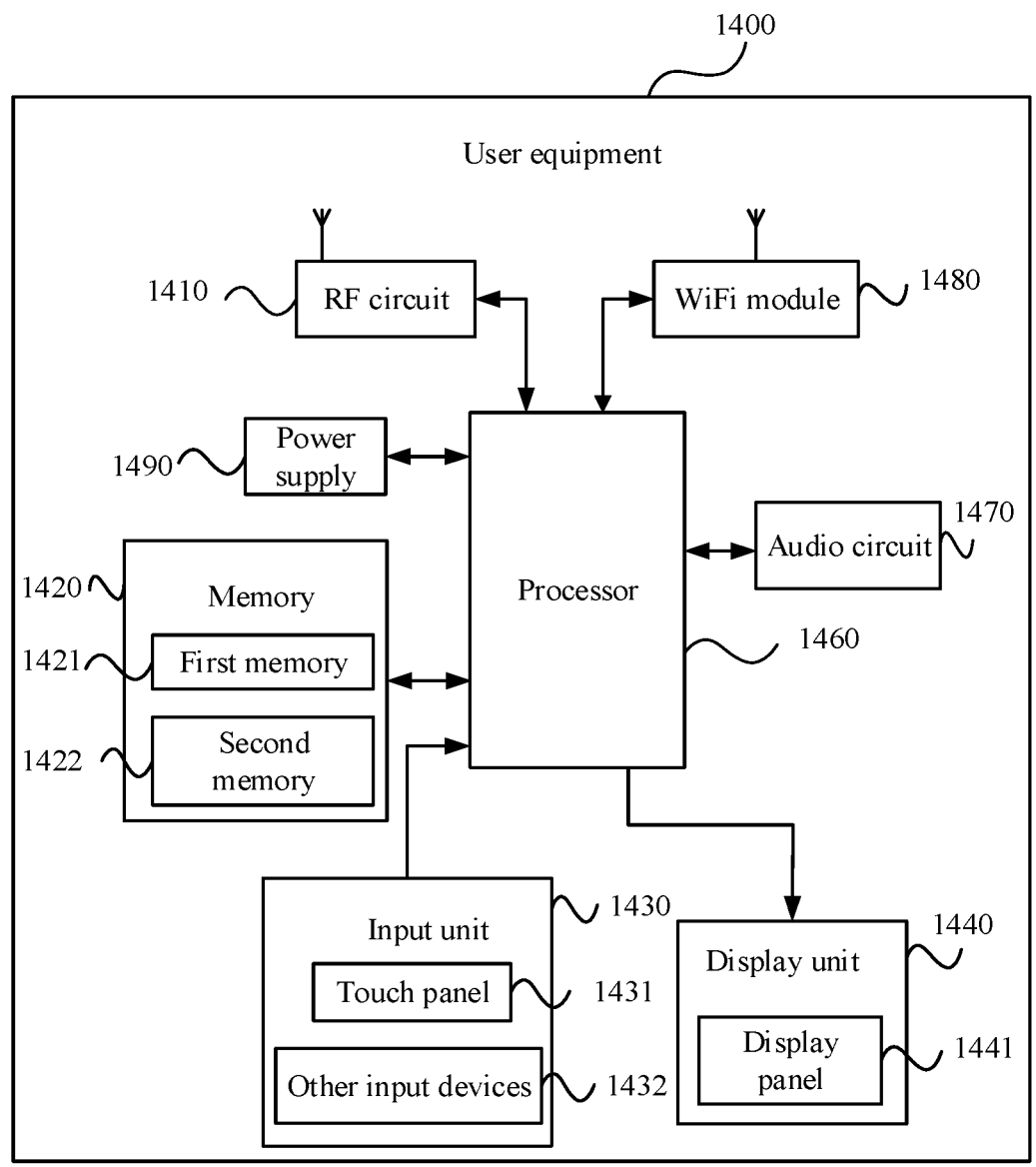
FIG. 14 is a schematic structural diagram of a receiving terminal according to an embodiment of the present disclosure.

In an embodiment of the present disclosure, the receiving terminal is a user equipment. FIG. 14 is a structural block diagram of the user equipment of the embodiment of the present disclosure. The user equipment 1400 shown in FIG. 14 includes a radio frequency (Radio Frequency, RF) circuit 1410, a memory 1420, an input unit 1430, a display unit 1440, a processor 1460, an audio circuit 1470, a WiFi (Wireless Fidelity) module 1480 and a power supply 1490.

The input unit 1430 may be configured to receive numeric or character information inputted by a user, and to generate signal inputs related to user settings and function control of the user equipment 1400. Specifically, in an embodiment of the present disclosure, the input unit 1430 may include a touch panel 1431. The touch panel 1431, also referred to as a touch screen, can collect touch operations from the user on or near the touch panel (such as an operation performed by the user using any suitable object or accessory such as a finger or a stylus on the touch panel 1431), and drive a corresponding connection device according to a predetermined program. Optionally, the touch panel 1431 may include two parts: a touch detection device and a touch controller. The touch detection device detects a touch position of the user, detects a signal brought by the touch operation, and transmits the signal to the touch controller; and the touch controller receives the touch information from the touch detection device, converts the touch information into contact coordinates, sends the contact coordinates to the processor 1460, and can receive and execute commands from the processor 1460. In addition, the touch panel 1431 can be implemented in various types such as resistive, capacitive, infrared, and surface acoustic waves. In addition to the touch panel 1431, the input unit 1430 may further include other input devices 1432. The other input devices 1432 may include, but not limited to, one or more of a physical keyboard, function buttons (such as a volume control button and a switch button), a trackball, a mouse, or a joystick.

The display unit 1440 can be used to display information inputted by the user or information provided to the user, and various menu interfaces of the user equipment 1400. The display unit 1440 may include a display panel 1441. Optionally, the display panel 1441 may be configured in the form of a light emitting diode LCD or an organic light-emitting diode (Organic Light-Emitting Diode, OLED).

It should be noted that the touch panel 1431 may cover the display panel 1441 to form a touch screen, and when the touch display screen detects a touch operation on or near it, the touch operation is transmitted to the processor 1460 to determine the type of the touch event, and then the processor 1460 provides a corresponding visual output on the touch screen according to the type of touch event.

The touch screen includes an application interface display region and a common control display area. The arrangement of the application interface display region and the common control display region is not limited, which may be up-and-down arrangement or left-and-right arrangement, as long as it can distinguish the two display regions. The application interface display region can be used to display interfaces of applications. Each interface can include interface elements such as at least one application icon and/or widget desktop control. The application interface display region may also be an empty interface that does not contain any content. The common control display region is used to display controls with high usage, such as setting buttons, interface numbers, scroll bars, phone book icons, and other application icon.

The processor 1460 is a control center of the user equipment 1400, which connects various parts of the entire mobile phone by using various interfaces and wires, performs functions of the user equipment 1400 and process data by running or executing software programs and/or modules stored in the first memory 1421 and invoking data stored in the second memory 1422, thereby performing overall monitoring on the user equipment 1400. Optionally, the processor 1460 may include one or more processing units.

In an embodiment of the present disclosure, the processor 1460 is configured, by invoking the software programs and/or modules stored in the first memory 1421 and the data stored in the second memory 1422, to: obtain side information and a target data block transmitted by a transmitting terminal, where the target data block is obtained by the transmitting terminal through scrambling an initial data block according to a predetermined scrambling mode, and the side information carries a scrambling mode index corresponding to the predetermined scrambling mode; determine a scrambling mode corresponding to the scrambling mode index carried in the side information according to a predetermined relation between scrambling mode indexes and scrambling modes; and obtain the initial data block by descrambling the target data block according to the scrambling mode as determined.

Optionally, the processor 1460 is further configured to obtain the side information from two sub-bands adjacent to the target data block above in a predetermined time-frequency resource mapping manner, where the predetermined way of time-frequency resource mapping is mapping the side information to the two sub-bands adjacent to the target data block.

Optionally, the processor 1460 is further configured to decode the side information to obtain the scrambling mode index carried in the side information.

Optionally, the processor 1460 is further configured to determine a phase rotation sequence corresponding to a phase rotation sequence index carried in the side information according to a predetermined relation between phase rotation sequence indexes and phase rotation sequences.

Optionally, the processor 1460 is further configured to decode the initial data block to obtain a data block, where the initial data block is obtained by the transmitting terminal through encoding the data block.

The user equipment according to the present disclosure may be a cellphone, a tablet computer, a personal digital assistant (Personal Digital Assistant, PDA), or an on-board computer.

The user equipment 1400 can implement the processes performed by the user equipment according to the foregoing embodiments, which is not redundantly described for purpose of conciseness.

In the user equipment 1400 according to the embodiments of the present disclosure, the processor 1460 is configured to: obtain side information and a target data block transmitted by a transmitting terminal, where the target data block is obtained by the transmitting terminal through scrambling an initial data block according to a predetermined scrambling mode and the side information carries a scrambling mode index corresponding to the predetermined scrambling mode; determine a scrambling mode corresponding to the scrambling mode index carried in the side information according to a predetermined relation between scrambling mode indexes and scrambling modes; and obtain the initial data block by descrambling the target data block according to the scrambling mode as determined. The receiving terminal according to the embodiments of the present disclosure can reliably receive the side information transmitted by a transmitting terminal, obtain the scrambling mode of the target data block according to the side information and then obtain the data block by descrambling the target data block according to the scrambling mode as obtained.

Those skilled in the art will well appreciate that the units and algorithm steps of the various examples described in conjunction with the embodiments according to the present disclosure can be implemented in the form of electronic hardware or a combination of computer software and electronic hardware. Whether these functions are performed in hardware or software depends on the specific application and design constraints of the solution. Those skilled in the art can use different methods to implement the described functions for each particular application, but such implementation should not be considered as beyond the scope of the present disclosure.

Those skilled in the art can clearly understand that for convenience and brevity of description, reference can be made to the corresponding processes in the foregoing method embodiment for specific operating processes of the system, the device and the units described above, which is therefore not described herein redundantly.

It should be understood that in the embodiments according to the present application, the disclosed device and method may be implemented in other manners. For example, the device embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between devices or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that is able to store program codes, such as a USB flash drive, a mobile hard disk, a ROM, a RAM, a magnetic disk, or an optical disk.

Those skilled in the art will well appreciate that all or part of the processes of the methods according to the above embodiments can be implemented by related hardware under the control of a computer program, and the program may be stored in a computer readable storage medium and implement the processes of the methods according to the above embodiments. The storage medium may be a magnetic disk, an optical disk, a read-only memory (Read-Only Memory, ROM), or a random access memory (Random Access Memory, RAM).

The above-described embodiments are merely some preferred embodiment of the present disclosure, and are not intended to limit the present disclosure. Any modifications, equivalents or improvements made within the spirit and principles of the present disclosure shall fall within the scope of the present disclosure.

What is claimed is:

1. An information transmission method for reducing Peak to Average Power Ratio (PAPR), applied to a transmitting terminal, comprising:

scrambling an initial data block according to a predetermined scrambling mode to obtain a scrambled target data block;

determining a scrambling mode index corresponding to the predetermined scrambling mode according to a predetermined relation between scrambling mode indexes and scrambling modes;

generating side information carrying the determined scrambling mode index based on the scrambling mode index; and transmitting the side information and the target data block to a receiving terminal, wherein the scrambling the initial data block according to the predetermined scrambling mode to obtain the scrambled target data block comprises:

dividing the initial data block into V data sub-blocks, wherein each of the data sub-blocks corresponds to W different phase rotations, and both V and W are positive integers;

determining one phase rotation for each of the data sub-blocks from the W different phase rotations to obtain a phase rotation sequence of the initial data block; and obtaining the target data block by scrambling the initial data block based on the phase rotation sequence of the initial data block, wherein the scrambling mode is the phase rotation sequence for the V data sub-blocks of the initial data block.

2. The information transmission method for reducing PAPR according to claim 1, wherein before scrambling the initial data block according to the predetermined scrambling mode to obtain the scrambled target data block, the method further comprises:
obtaining the initial data block by encoding a data block.

3. The information transmission method for reducing PAPR according to claim 1, wherein the determining the scrambling mode index corresponding to the predetermined scrambling mode according to the predetermined relation between scrambling mode indexes and scrambling modes comprises:
determining a phase rotation sequence index corresponding to a phase rotation sequence of the target data block according to a predetermined relation between phase rotation sequence indexes and phase rotation sequences; and/or
wherein the generating side information carrying the determined scrambling mode index based on the scrambling mode index comprises:
obtaining the side information carrying the determined scrambling mode index by encoding the determined scrambling mode index.

4. The information transmission method for reducing PAPR according to claim 1, wherein the transmitting the side information and the target data block to the receiving terminal comprises:
performing resource mapping on the side information and the target data block in a predetermined time-frequency resource mapping manner; and
transmitting the side information and the target data block subjected to the resource mapping to the receiving terminal.

5. The information transmission method for reducing PAPR according to claim 4, wherein the performing resource mapping on the side information and the target data block in the predetermined time-frequency resource mapping manner comprises:
mapping the side information to two sub-bands adjacent to the target data block.

6. An information transmission method for reducing PAPR, applied to a receiving terminal, comprising:
obtaining side information and a target data block transmitted by a transmitting terminal, wherein the target data block is obtained by the transmitting terminal through scrambling an initial data block according to a predetermined scrambling mode, and the side information carries a scrambling mode index corresponding to the predetermined scrambling mode;
determining a scrambling mode corresponding to the scrambling mode index carried in the side information according to a predetermined relation between scrambling mode indexes and scrambling modes; and
descrambling the target data block according to the determined scrambling mode to obtain the initial data block,
wherein the obtaining the scrambled target data block through scrambling the initial data block according to the predetermined scrambling mode comprises:
dividing the initial data block into V data sub-blocks, wherein each of the data sub-blocks corresponds to W different phase rotations, and both V and W are positive integers;
determining one phase rotation for each of the data sub-blocks from the W different phase rotations to obtain a phase rotation sequence of the initial data block; and
obtaining the target data block by scrambling the initial data block based on the phase rotation sequence of the initial data block, wherein the scrambling mode is the phase rotation sequence for the V data sub-blocks of the initial data block.

7. The information transmission method for reducing PAPR according to claim 6, wherein the obtaining the side information transmitted by the transmitting terminal comprises:
obtaining the side information from two sub-bands adjacent to the target data block in a predetermined time-frequency resource mapping manner, wherein the predetermined time-frequency resource mapping manner comprises mapping the side information to the two sub-bands adjacent to the target data block.

8. The information transmission method for reducing PAPR according to claim 6, wherein before the determining the scrambling mode corresponding to the scrambling mode index carried in the side information according to the predetermined relation between scrambling mode indexes and scrambling modes, the method further comprises:
obtaining the scrambling mode index carried in the side information by decoding the side information.

9. The information transmission method for reducing PAPR according to claim 6, wherein the determining the scrambling mode corresponding to the scrambling mode index carried in the side information according to the predetermined relation between scrambling mode indexes and scrambling modes comprises:
determining a phase rotation sequence corresponding to a phase rotation sequence index carried in the side information according to a predetermined relation between phase rotation sequence indexes and phase rotation sequences; and/or
wherein after the descrambling the target data block according to the determined scrambling mode to obtain the initial data block, the method further comprises:
obtaining a data block by decoding the initial data block, wherein the initial data block is obtained by the transmitting terminal through encoding the data block.

10. A transmitting terminal, comprising:
a memory, a processor and a computer program that is stored in the memory and executable on the processor,
wherein when executing the computer program, the processor is configured to:
scramble an initial data block according to a predetermined scrambling mode to obtain a scrambled target data block;
determine a scrambling mode index corresponding to the predetermined scrambling mode according to a predetermined relation between scrambling mode indexes and scrambling modes;
generate side information carrying the determined scrambling mode index based on the scrambling mode index; and
transmit the side information and the target data block to a receiving terminal,
wherein the processor is further configured to:
divide the initial data block into V data sub-blocks, wherein each of the data sub-blocks corresponds to W different phase rotations, and both V and W are positive integers;
determite one phase rotation for each of the data sub-blocks from the W diferent phase rotations to obtain a phase rotation sequence of the initial data block; and
obtain the target data block by scrambling the initial data block based on the phase rotation sequence of the initial data block.

11. The transmitting terminal according to claim 10, wherein the processor is further configured to obtain the initial data block by encoding a data block.

12. The transmitting terminal according to claim 10, wherein the processor is further configured to determine a phase rotation sequence index corresponding to a phase rotation sequence of the target data block according to a predetermined relation between phase rotation sequence indexes and phase rotation sequences.

13. The transmitting terminal according to claim 10, wherein the processor is further configured to obtain the side information carrying the determined scrambling mode index by encoding the determined scrambling mode index.

14. The transmitting terminal according to claim 10, wherein the processor is further configured to:
   perform resource mapping on the side information and the target data block in a predetermined time-frequency resource mapping manner; and
   transmit the side information and the target data block subjected to the resource mapping to the receiving terminal; and
   wherein the processor is further configured to map the side information to two sub-bands adjacent to the target data block.

15. A receiving terminal, comprising:
   a memory, a processor and a computer program that is stored in the memory and executable on the processor, wherein the processor is configured to perform the information transmission method for reducing PAPR according to claim 8 when executing the computer program.

16. The receiving terminal according to claim 15, wherein the processor is further configured to obtain the side information from two sub-bands adjacent to the target data block in a predetermined time-frequency resource mapping manner, wherein the predetermined time-frequency resource mapping manner comprises mapping the side information to the two sub-bands adjacent to the target data block.

17. The receiving terminal according to claim 15, wherein the processor is further configured to obtain the scrambling mode index carried in the side information by decoding the side information.

18. The receiving terminal according to claim 15, wherein the processor is further configured to determine a phase rotation sequence corresponding to a phase rotation sequence index carried in the side information according to a predetermined relation between phase rotation sequence indexes and phase rotation sequences; and/or
   wherein the processor is further configured to obtain a data block by decoding the initial data block, wherein the initial data block is obtained by the transmitting terminal through encoding the data block.

* * * * *